United States Patent
Bills

(10) Patent No.: US 9,616,711 B1
(45) Date of Patent: Apr. 11, 2017

(54) APPARATUS, SYSTEM, AND METHOD FOR ACHIEVING MAGNETICALLY HARNESSED LOCOMOTION OF WHEELED MACHINES

(71) Applicant: Jon Bills, South Jordan, UT (US)

(72) Inventor: Jon Bills, South Jordan, UT (US)

(73) Assignee: Jon Bills, South Jordan, UT (US)

( * ) Notice: Subject to any disclaimer, the term of this patent is extended or adjusted under 35 U.S.C. 154(b) by 0 days.

(21) Appl. No.: 14/791,338

(22) Filed: Jul. 3, 2015

(51) Int. Cl.
*B60K 1/02* (2006.01)
*B60B 35/14* (2006.01)
*B60K 1/00* (2006.01)

(52) U.S. Cl.
CPC ............... *B60B 35/14* (2013.01); *B60K 1/00* (2013.01); *B60B 2900/931* (2013.01); *B60Y 2200/80* (2013.01)

(58) Field of Classification Search
CPC ........ B65G 39/02; B65G 39/04; B65G 13/11; B60B 27/026; B60B 35/14; B60K 17/04; B60K 17/043; B60K 1/02
See application file for complete search history.

(56) References Cited

U.S. PATENT DOCUMENTS

| | | | |
|---|---|---|---|
| 4,702,668 A | 10/1987 | Carlisle et al. | |
| 6,107,761 A * | 8/2000 | Seto | B60K 1/02 180/179 |
| 6,620,022 B1 | 9/2003 | Smith et al. | |
| 6,886,647 B1 | 5/2005 | Gotta | |
| 8,283,813 B2 | 10/2012 | Gilchrist et al. | |
| 8,393,421 B2 | 3/2013 | Kornstein et al. | |
| 8,487,484 B1 | 7/2013 | Miller, Jr. et al. | |
| 2009/0178506 A1 | 7/2009 | Yamamoto et al. | |
| 2010/0162799 A1* | 7/2010 | Andersson | G01L 3/10 73/54.31 |
| 2013/0000438 A1* | 1/2013 | Ouellet | B25J 5/007 74/490.03 |
| 2013/0069450 A1 | 3/2013 | Hosek et al. | |

FOREIGN PATENT DOCUMENTS

EP 1274181 1/2003

OTHER PUBLICATIONS

"Magnet," https://en.wikipedia.org/wiki/Magnet, Wikipedia, (Jul. 4, 2015).

(Continued)

*Primary Examiner* — Bryan Evans

(57) ABSTRACT

An apparatus for achieving magnetically harnessed locomotion may include (1) a housing that at least partially houses a wheeled machine, (2) a plurality of wheels attached to a plurality of independently rotatable axles that are oriented substantially opposite one another along a plane of the wheeled machine, (3) a plurality of motors having shafts oriented substantially perpendicular to the independently rotatable axles, (4) at least one magnet positioned between the independently rotatable axles within the housing such that a magnetic force of the magnet (A) pulls the independently rotatable axles toward an inward point of the wheeled machine and (B) causes the wheels attached to the independently rotatable axles to press against the shafts of the motors. Various other apparatuses, systems, and methods are also disclosed.

20 Claims, 6 Drawing Sheets

(56) References Cited

OTHER PUBLICATIONS

Jeffrey, Colin "Practical magnetic levitating transmission gear system loses its teeth," Gizmag, http://www.gizmag.com/frictionless-superconductor-magnetic-levitating-gear-system/35005/, (Dec. 1, 2014).

Stanek, Ondrej "PocketBot 2 the multi-robot system," http://www.ostan.cz/PocketBot2/. (Dec. 3, 2011).

"Printed Circuit Board," https://en.wikipedia.org/wiki/Printed_circuit_board. Wikipedia, (Jul. 3, 2015).

\* cited by examiner

APPARATUS, SYSTEM, AND METHOD FOR ACHIEVING MAGNETICALLY HARNESSED LOCOMOTION OF WHEELED MACHINES

BACKGROUND

Wheeled machines often achieve locomotion by applying output shafts of motors to a transmission. For example, a wheeled robot may include multiple motors intended to facilitate locomotion. However, in this example, the output shafts of these motors may rotate at very high speeds with very little torque. As a result, this wheeled robot may be unable to move at all unless the motors are geared down by way of a transmission such that the output shafts of the motors rotate at slower speeds with increased torque.

Unfortunately, while transmissions may be able to gear down motors to facilitate locomotion of wheeled machines, traditional transmissions may also introduce a number of undesirable features and/or considerations into the design of such wheeled machines. For example, a traditional transmission may include one or more gears that consume a lot of physical space and/or add too much weight to the load of a small wheeled robot. As a result, the traditional transmission may exceed the limited size, power, and/or load constraints of a particular design of the small wheeled robot.

As another example, a traditional transmission may introduce and/or add a certain monetary cost to the design of a wheeled robot. As a result, the manufacturer of the small robot may need to pass on this monetary cost to consumers, thereby potentially harming the manufacturer's likelihood of success and/or discouraging certain consumers from purchasing the wheeled robot.

The instant disclosure, therefore, identifies and addresses a need for apparatuses, systems, and methods for achieving magnetically harnessed locomotion of wheeled machines.

SUMMARY

As will be described in greater detail below, the instant disclosure generally relates to apparatuses, systems, and methods for achieving magnetically harnessed locomotion of wheeled machines. In one example, an apparatus for accomplishing such a task may include (1) a housing that at least partially houses a wheeled machine, (2) a plurality of wheels attached to a plurality of independently rotatable axles that are oriented substantially opposite one another along a plane of the wheeled machine, (3) a plurality of motors having shafts oriented substantially perpendicular to the independently rotatable axles, (4) at least one magnet positioned between the independently rotatable axles within the housing such that a magnetic force of the magnet (A) pulls the independently rotatable axles toward an inward point of the wheeled machine and (B) causes the wheels attached to the independently rotatable axles to press against the shafts of the motors.

Similarly, a housing for achieving magnetically harnessed locomotion of a wheeled machine may include (1) a plurality of axle-supporting guides that support a plurality of independently rotatable axles that (A) are oriented substantially opposite one another along a plane of the wheeled machine and (B) each include a wheel, (2) a cavity that holds a magnet between the independently rotatable axles such that a magnetic force of the magnet (A) pulls the independently rotatable axles toward an inward point of the wheeled machine and (B) causes each wheel included on the independently rotatable axles to press against a shaft of a motor oriented substantially perpendicular to the independently rotatable axles on the wheeled machine.

Additionally or alternatively, a method for achieving magnetically harnessed locomotion of wheeled machines may include (1) positioning a magnet within a cavity of a detachable piece of a housing that at least partially houses a wheeled machine, (2) securing a circuit board of the wheeled machine within the housing by (A) placing the circuit board of the wheeled machine between the detachable piece of the housing and another detachable piece of the housing and (B) attaching the detachable piece of the housing to the other detachable piece of the housing, (3) inserting a plurality of independently rotatable axles that each include a wheel into a plurality of axle-supporting guides located on substantially opposite sides of the cavity such that (A) the independently rotatable axles are oriented substantially opposite one another along a plane of the wheeled machine, (B) the independently rotatable axles are pulled toward an inward point of the wheeled machine by a magnetic force of the magnet, and (C) each wheel included on the independently rotatable axles presses against a shaft of a motor that is attached to the circuit board and oriented substantially perpendicular to the independently rotatable axles.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
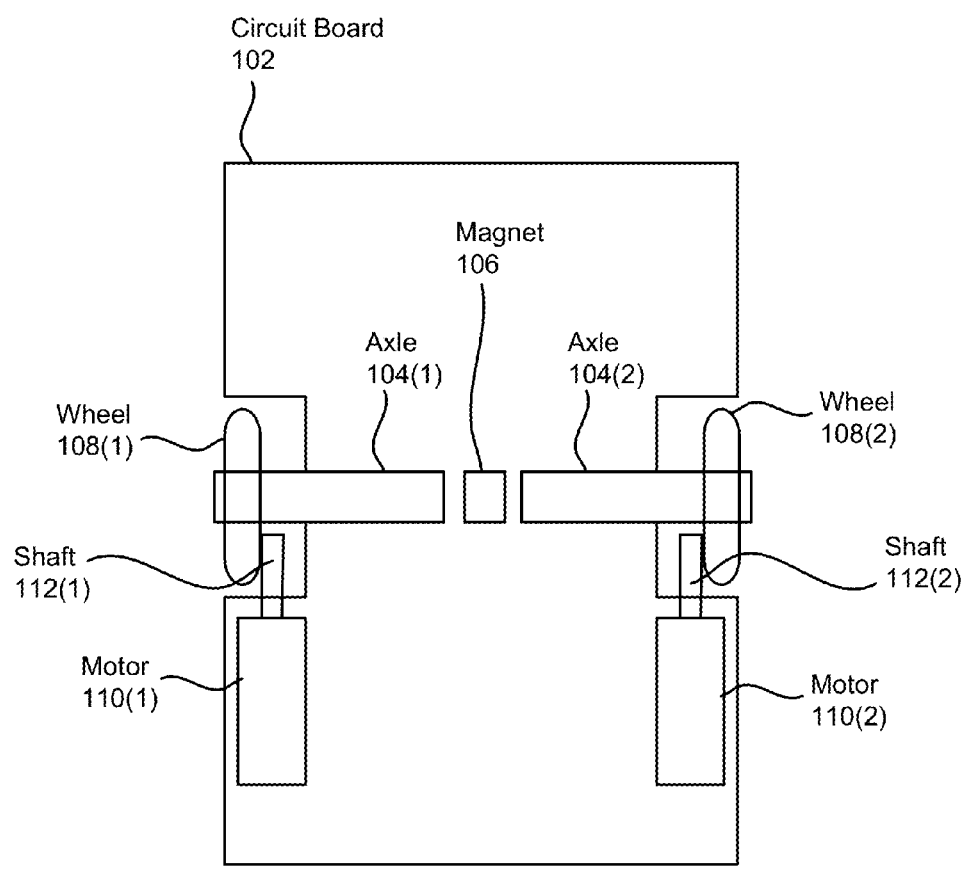
FIG. 1 is an illustration of a magnetic harnessing of locomotion.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for achieving magnetically harnessed locomotion of wheeled machines. As will be explained in greater detail below, embodiments of the instant disclosure may facilitate designing smaller, lighter, and/or cheaper wheeled machines by eliminating the need for a traditional geared transmission that gears down motors to rotate at slower speeds and/or increase torque. For example, embodiments of the instant disclosure may facilitate positioning a magnet within a housing that at least partially houses a wheeled machine and inserting independently rotatable axles that each include a wheel into axle-supporting guides located on substantially opposite sides of the magnet within the wheeled machine. By so positioning the magnet and inserting the independently rotatable axles in this way, these embodiments may enable the independently rotatable axles to be pulled toward an inward point of the wheeled machine by the magnet such that the wheels attached to the independently rotatable axles press against the shafts of the wheeled machine's motors.

In such embodiments, by pulling the independently rotatable axles inward in this way, the magnetic force of the magnet may cause the wheels attached to the independently rotatable axles to abut the shafts of the motors such that the wheels rotate as the shafts of the motors rotate. In other words, these embodiments may enable the wheels themselves to each simultaneously function and/or serve as both a gear and a wheel. Accordingly, the wheels themselves may effectively gear down the motors to rotate at slower speeds with increased torque.

In some examples, the housing of the wheeled machine may hold various components (such as the magnet, the axles, the wheels, the motors, and/or any circuit boards) of the wheeled machine intact and/or position these components in a way that enables the wheeled machine to achieve magnetically harnessed locomotion. Additionally or alternatively, the housing of the wheeled machine may facilitate assembly and/or disassembly of the wheeled machine and/or certain components of the wheeled machine. The housing may also protect certain components against harm and/or damage. Moreover, the housing of the wheeled machine may enable the wheeled machine to balance and/or maintain stability during locomotion. Furthermore, the housing of the wheeled machine may be designed to increase the aesthetic appeal of the wheeled machine.

In some examples, the housing of the wheeled machine may reduce the amount of physical space and/or power needed to achieve locomotion. In other words, the housing may facilitate making the wheeled machine smaller in size and/or using less powerful motors to achieve locomotion. Additionally or alternatively, the housing of the wheeled machine may effectively reduce the monetary cost of manufacturing and/or distributing the wheeled machine. As a result, the manufacturer of the wheeled machine may pass on any monetary savings to consumers and/or increase its own profits.

The following will provide, with reference to FIG. 1, examples of a magnetic harnessing of locomotion. The discussion corresponding to FIG. 2 will provide a detailed description of an exemplary apparatus for achieving magnetically harnessed locomotion of wheeled machines. The discussion corresponding to FIG. 3 will provide a detailed description of an exemplary assembly of an apparatus for achieving magnetically harnessed locomotion of wheeled machines. The discussion corresponding to FIG. 4 will provide a detailed description of an exemplary wheeled machine that achieves magnetically harnessed locomotion. The discussion corresponding to FIG. 5 will provide a detailed description of an exemplary housing of a wheeled machine that achieves magnetically harnessed locomotion. Finally, the discussion corresponding to FIG. 6 will provide a detailed description of an exemplary method for achieving magnetically harnessed locomotion of wheeled machines.

FIG. 1 shows an illustration of an exemplary magnetic harnessing of locomotion 100. The phrase "magnetic harnessing of locomotion" and the term "magnetically harnessed locomotion," as used herein, generally refer to any type or form of locomotion caused by and/or involving a wheel that is pulled against a shaft of a motor by magnetic force. The wheel may rotate as the shaft of the motor rotates due at least in part to the wheel being pulled against the shaft of the motor by the magnetic force. In the event that the motors and/or the wheels are incorporated into a wheeled machine, such rotation may cause the wheeled machine to move and/or travel on and/or across a surface.

As illustrated in FIG. 1, magnetic harnessing of locomotion 100 may include and/or involve motors 110(1) and 110(2) attached to and/or used in conjunction with a circuit board 102. In this example, motor 110(1) may have a shaft 112(1), and motor 110(2) may have a shaft 112(2). Magnetic harnessing of locomotion 100 may also include independently rotatable axles 104(1) and 104(2) that are pulled toward a magnet 106 by magnetic force. In this example, a wheel 108(1) may be attached to independently rotatable axle 104(1), and wheel 108(2) may be attached to independently rotatable axle 104(2). Although illustrated as separate entities in FIG. 1 (as well as other figures), axle 104(1) and wheel 108(1) may constitute and/or represent a single inseparable item or component, and axle 104(2) and wheel 108(2) may constitute and/or represent another single inseparable item or component.

As a result of the magnetic force pulling independently rotatable axles 104(1) and 104(2) toward magnet 106, wheels 108(1) and 108(2) may press and/or be held against shafts 112(1) and 112(2), respectively. Accordingly, since wheels 108(1) and 108(2) press and/or are held against shafts 112(1) and 112(2) by magnetic force, wheels 108(1) and 108(2) may rotate as shafts 112(1) and 112(2) rotate (e.g., when motors 110(1) and 110(2) are powered by electric current). Similarly, as wheels 108(1) and 108(2) rotate, axles 104(1) and 104(2) may also rotate. Alternatively, as wheels 108(1) and 108(2) rotate, axles 104(1) and 104(2) may remain substantially motionless.

The term "magnet," as used herein, generally refers to any type or form of object and/or material that produces a magnetic field. In one example, magnet 106 may attract another magnet and/or another object that includes magnetic and/or ferromagnetic material. Examples of magnet 106 include, without limitation, neodymium magnets, ferrite magnets, rare-earth magnets, samarium-cobalt magnets, alnico magnets, variations of one or more of the same, combinations of one or more of the same, or any other suitable magnet.

The term "axle," as used herein, generally refers to any type or form of bar, shaft, rivet, and/or spindle that rotates. In one example, axles 104(1) and 104(2) may each be independently rotatable on or about an axis. In this example, since axles 104(1) and axles 104(2) are independent of one another, axles 104(1) and 104(2) may simultaneously rotate on or about the axis in the same direction or in opposite directions. Axles 104(1) and 104(2) may each be made of and/or include magnetic and/or ferromagnetic material. Accordingly, axles 104(1) and 104(2) may each be attracted to magnet 106. Examples of such magnetic and/or ferromagnetic material include, without limitation, iron, nickel, cobalt, rare-earth metals, ferrites, magnetite, lodestone, platinum, aluminum, variations of one or more of the same, combinations of one or more of the same, or any other suitable magnetic and/or ferromagnetic material.

The term "wheel," as used herein, generally refers to any type or form of circular frame, disk, drum, bearing, and/or round object. In one example, wheels 108(1) and 108(2) may each be made of and/or include various types of materials. Examples of such types of materials include, without limitation, rubbers, plastics, silicones, polymers, variations of one or more of the same, combinations of one or more of the same, or any other suitable types of wheel materials. Additionally or alternatively, wheels 104(1) and 104(2) may each include and/or represent a tire and/or an O-ring.

The term "motor," as used herein, generally refers to any type or form of device, engine, and/or mechanism that converts one form of energy into mechanical energy. In one example, motors 110(1) and 110(2) may be attached and/or mounted to circuit board 102. Examples of motors 110(1) and 110(2) include, without limitation, electric motors, Direct Current (DC) motors, Alternating Current (AC) motors, vibration motors (without shaft weights), brushless motors, switched reluctance motors, synchronous motors, rotary motors, servo motors, coreless motors, stepper motors, universal motors, variations of one or more of the same, combinations of one or more of the same, or any other suitable motors.

The term "shaft," as used herein in connection with a motor, generally refers to any type or form of output bar and/or spindle that rotates and/or transfers mechanical energy from the motor in the form of rotation and/or torque. In one example, shaft 112(1) may be incorporated in and/or represent part of motor 110(1). Similarly, shaft 112(2) may be incorporated in and/or represent part of motor 110(2).

The term "circuit board," as used herein, generally refers to any type or form of structure and/or module that mechanically supports and/or electrically connects components of an electrical circuit. In some examples, circuit board 102 may include and/or represent a Printed Circuit Board (PCB). In one example, circuit board 102 may include various components that facilitate the flow of electric current to motors 110(1) and 110(2). Additionally or alternatively, circuit board 102 may include various components that enable a wheeled machine to sense and/or navigate its environment. Examples of such components include, without limitation, processors, microcontrollers, Field-Programmable Gate Arrays (FPGAs), regulators, batteries, resistors, capacitors, inductors, transistors, lighting devices, sensors, motor drivers, switches, wires, traces, variations of one or more of the same, combinations of one or more of the same, or any other suitable components.

Magnetic harnessing of locomotion 100 may be implemented in a variety of ways and/or contexts. For example, magnetic harnessing of locomotion 100 may be implemented by, through, and/or with apparatus 200 in FIG. 2 for achieving magnetically harness locomotion of a wheeled machine. In one example, apparatus 200 may constitute and/or represent the entire wheeled machine. In another example, apparatus 200 may constitute and/or represent certain components included in the wheeled machine.

Figure 2:
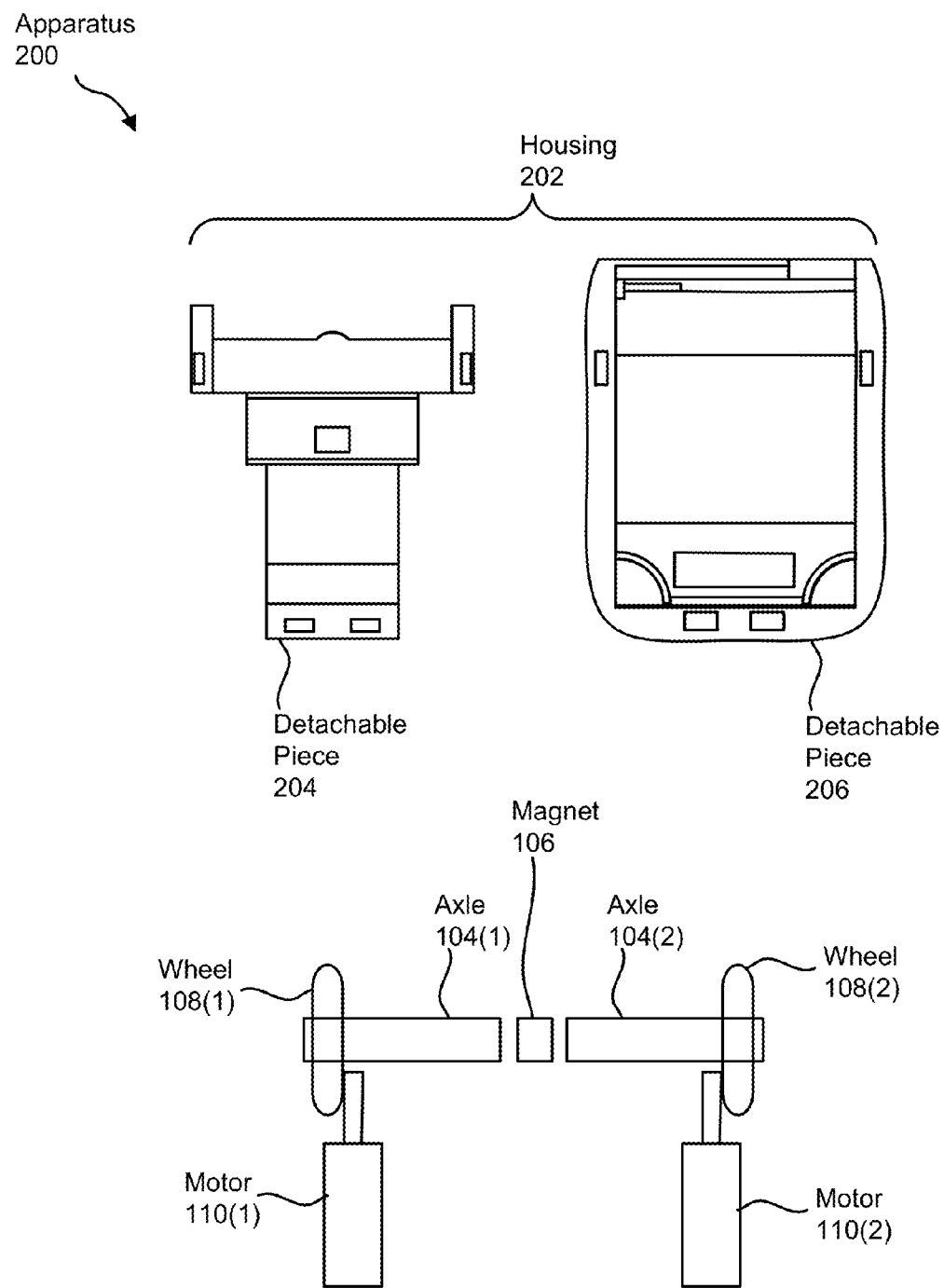
FIG. 2 is an illustration of an exemplary apparatus for achieving magnetically harnessed locomotion of wheeled machines.

As illustrated in FIG. 2, apparatus 200 may include a housing 202 of a wheeled machine. In this example, housing 202 of the wheeled machine may include detachable pieces 204 and 206. Detachable pieces 204 and 206 may attach and/or connect together (or to one another) to at least partially house, envelop, and/or enclose the wheeled machine. Detachable pieces 204 and 206 may attach and/or connect together by way of any suitable attachment means. Examples of such attachment means include, without limitation, snaps, fasteners, locks, adhesives, pins, screws, levers, joints, ties, clamps, clasps, slips, closures, stiches, staples, zippers, variations of one or more of the same, combinations of one or more of the same, or any other suitable attachment means.

The term "wheeled machine," as used herein, generally refers to any type or form of physical device that includes wheels that facilitate locomotion on or across a surface. Examples of such a wheeled machine include, without limitation, robots, vehicles, toys, remote control and/or radio-controlled machines, self-balancing machines, variations of one or more of the same, combinations of one or more of the same, or any other suitable wheeled machine.

The term "housing," as used herein, generally refers to any type or form of covering, casing, and/or shell that at least partially house, envelop, and/or enclose a wheeled machine. In one example, housing 202 may substantially envelop a circuit board that controls and/or delivers or distributes electrical power to the wheeled machine. Additionally or alternatively, housing 202 may substantially envelop and/or cover a battery that provides electrical power of the wheeled machine.

As illustrated in FIG. 2, apparatus 200 may also include magnet 106 whose magnetic force is used to pull independently rotatable axles 104(1) and 104(2) toward an inward point of the wheeled machine. In one example, independently rotatable axles 104(1) and 104(2) may include wheels 108(1) and 108(2), respectively. In other words, wheel 108(1) may be attached to independently rotatable axle 104(1), and wheel 108(2) may be attached to independently rotatable axle 104(2).

As a result of the magnetic force pulling independently rotatable axles 104(1) and 104(2) toward the inward point of the wheeled machine, wheels 108(1) and 108(2) may press and/or be held against shafts 112(1) and 112(2), respectively. Accordingly, since wheels 108(1) and 108(2) press and/or are held against shafts 112(1) and 112(2) by magnetic force, wheels 108(1) and 108(2) may rotate as shafts 112(1) and 112(2) rotate (e.g., when motors 110(1) and 110(2) are powered by electric current).

Figure 3:
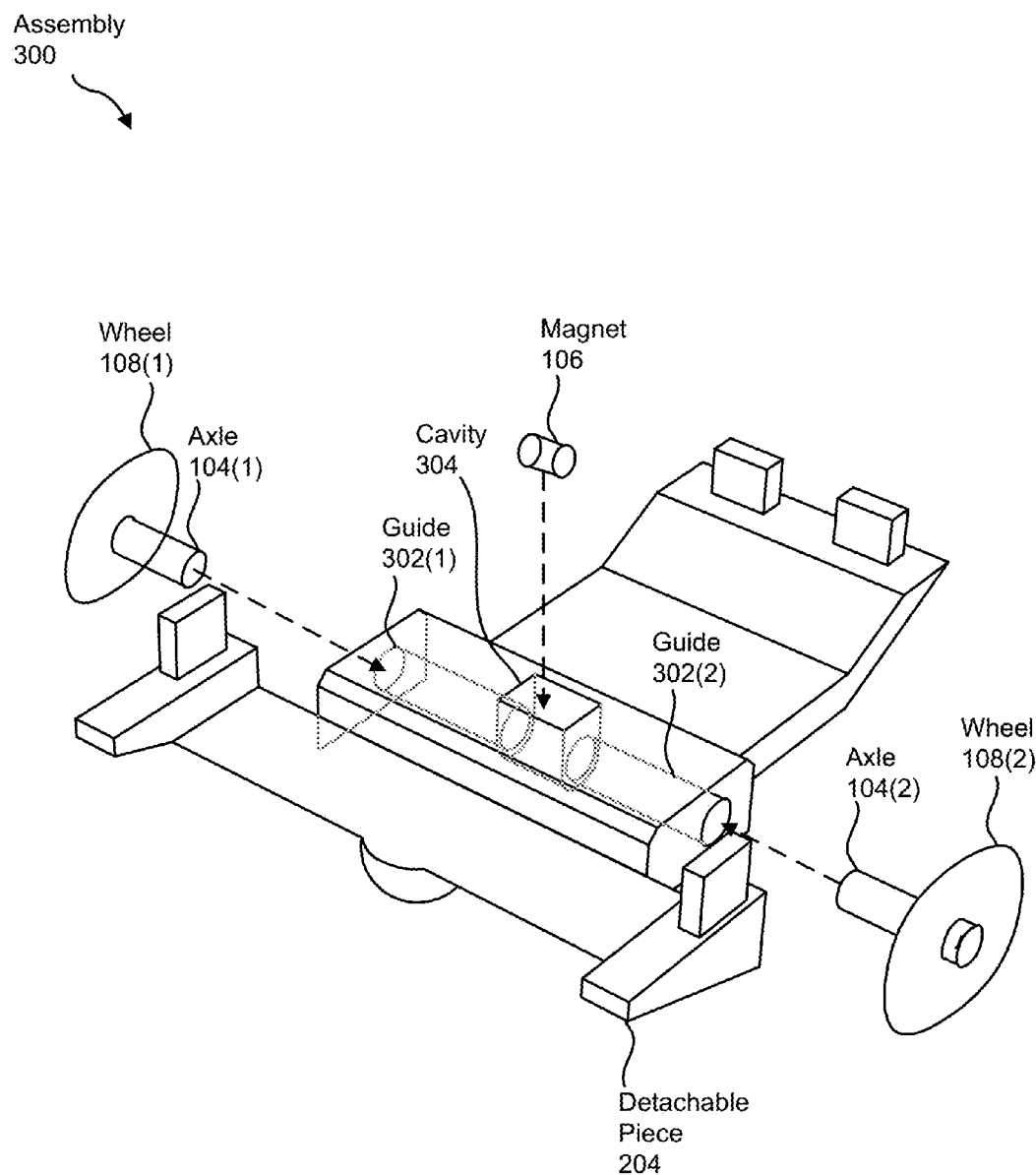
FIG. 3 is an illustration of an exemplary assembly of an apparatus for achieving magnetically harnessed locomotion of wheeled machines.

FIG. 3 shows an illustration of exemplary housing 202 of a wheeled machine that achieves magnetically harnessed locomotion. As illustrated in FIG. 3, assembly 300 may include and/or involve detachable piece 204 of housing 202, which is temporarily detached from detachable piece 206 of housing 202. In one example, detachable piece 204 may include a cavity 304 that holds and/or secures magnet 106 between axles 104(1) and 104(2). In this example, cavity 304 may be accessible only when detachable piece 204 is detached from detachable piece 206. As part of assembly 300, a user or manufacturer of the wheeled machine may insert and/or position magnet 106 within cavity 304 of detachable piece 204.

Additionally or alternatively, detachable piece 204 may include any type or form of mount (not necessarily illustrated in FIG. 3) that holds and/or secures magnet 106 in a certain position relative to axles 104(1) and 104(2). As part of a similar assembly, a user or manufacturer of the wheeled machine may insert and/or position magnet 106 within such a mount of detachable piece 204.

As illustrated in FIG. 3, detachable piece 204 may include axle-supporting guides 302(1) and 302(2) that guide and/or support axles 104(1) and 104(2) being pulled toward the inward point of the wheeled machine (e.g., toward magnet 106 and/or cavity 304). In this example, axle-supporting guides 302(1) and 302(2) may guide and/or support axles 104(1) and 104(2) as they rotate along with wheels 108(1) and 108(2). Alternatively, axle-supporting guides 302(1) and 302(2) may guide and/or support axles 104(1) and 104(2) as they remain substantially motionless as wheels 108(1) and 108(2) rotate. As part of assembly 300, a user or manufacturer of the wheeled machine may insert and/or position axles 104(1) and 104(2) into axle-supporting guides 302(1) and 302(2), respectively.

Figure 4:
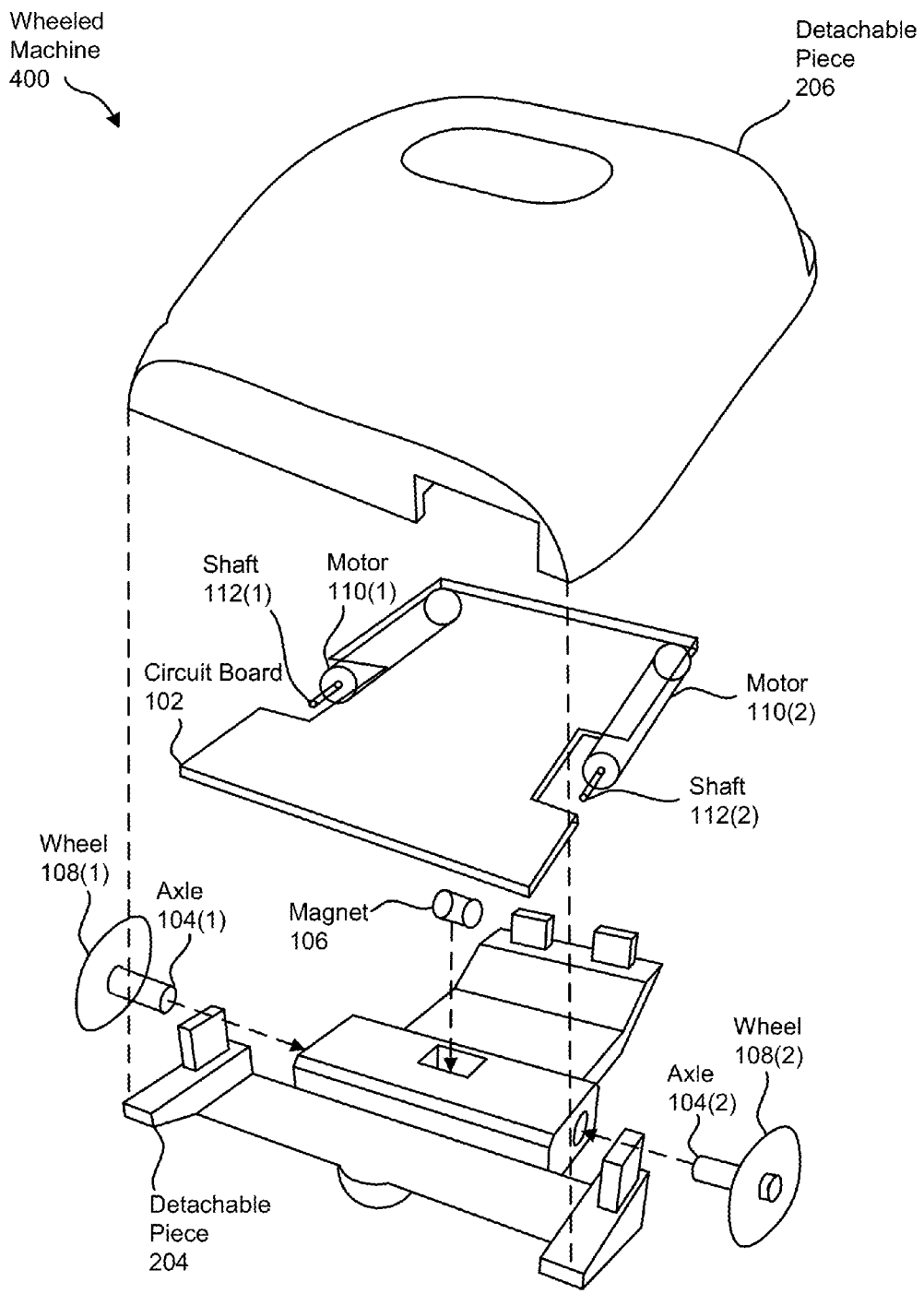
FIG. 4 is an illustration of an exemplary wheeled machine that achieves magnetically harnessed locomotion.

FIG. 4 shows an illustration of an exemplary wheeled machine 400 that achieves magnetically harnessed locomotion. As illustrated in FIG. 4, wheeled machine may include a magnet placed in a cavity or mount of detachable piece 204 of housing 202. In this example, circuit board 102 may sit and/or reside on top of detachable piece 204 of housing 202. In addition, axles 104(1) and 104(2) may be inserted into axle-supporting guides 302(1) and 302(2), respectively, such that the magnetic force of magnet 106 pulls axles 104(1) and 104(2) inward toward magnet 106. As a result, wheels 108(1) and 108(2) may abut and/or press against shafts 112(1) and 112(2), respectively.

In one example, detachable pieces 204 and 206 may be attached and/or connected together (or to one another) to at least partially house, envelop, and/or enclose wheeled machine 400. Additionally or alternatively, by attaching and/or connecting together detachable pieces 204 and 206, housing 202 may hold and/or secure circuit board 102 in place within wheeled machine 400.

Figure 5:
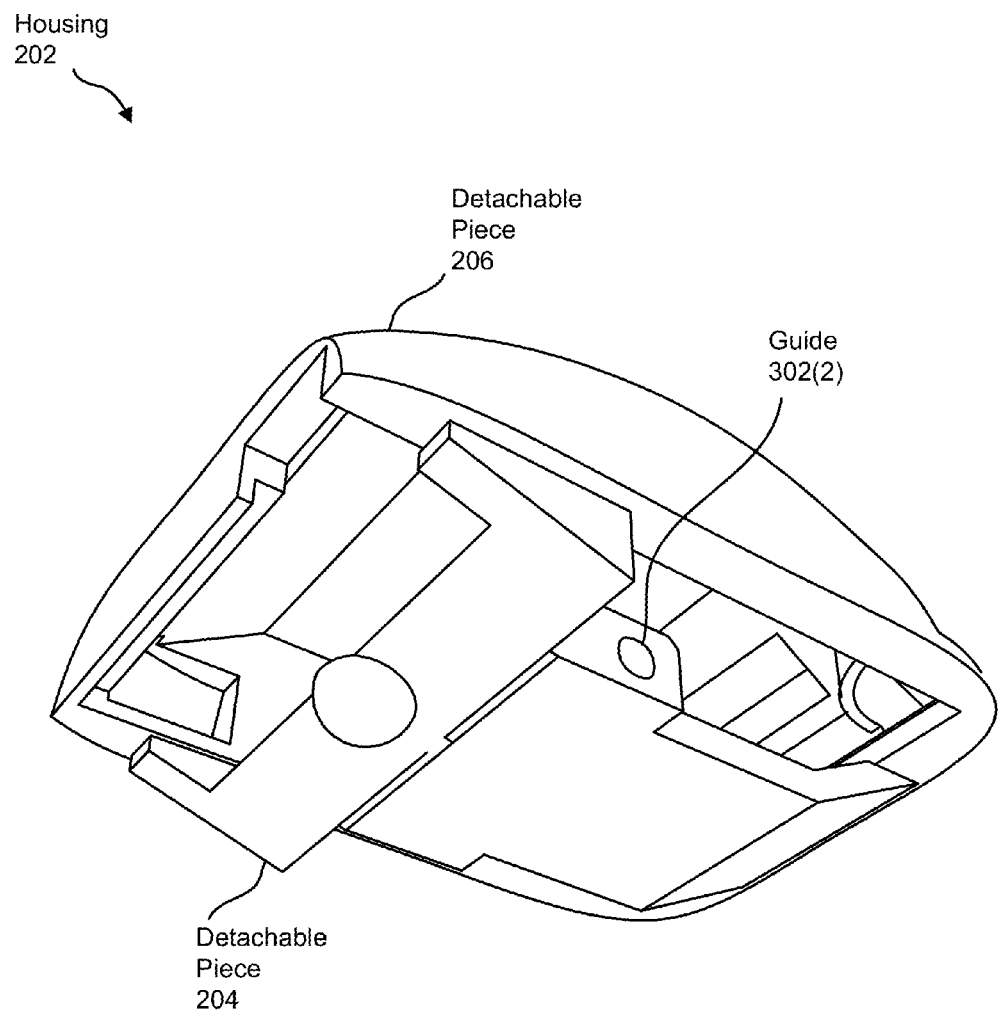
FIG. 5 is an illustration of an exemplary housing of a wheeled machine that achieves magnetically harnessed locomotion.

FIG. 5 shows an illustration of an exemplary housing of a wheeled machine that achieves magnetically harnessed locomotion. As illustrated in FIG. 5, housing 202 of the wheeled machine may include detachable pieces 204 and 206. In this example, detachable pieces 204 and 206 may be attached and/or connected together. Although not illustrated in this way in FIG. 5, housing 202 may house, envelop, and/or enclose various components (such as the magnet, the axles, the wheels, the motors, and/or any circuit boards) of the wheeled machine.

Additionally or alternatively, housing 202 may facilitate assembly and/or disassembly of the wheeled machine and/or certain components of the wheeled machine. Housing 202 may also protect certain components against harm and/or damage. Moreover, housing 202 may enable the wheeled machine to balance and/or maintain stability during locomotion. Furthermore, housing 202 may be designed to increase the aesthetic appeal of the wheeled machine.

Housing 202 may include a variety of exterior designs. In one example, housing 202 may include an exterior design that resembles an automobile. For example, the exterior design of housing 202 may resemble a tank. Additionally or alternatively, the exterior design of housing 202 may resemble a race and/or sports car.

In one example, housing 202 may include an exterior design that resembles an animal. For example, the exterior design of housing 202 may resemble a mouse. Additionally or alternatively, the exterior design of housing 202 may resemble a lion.

Housing 202 may be created in a variety of ways. Examples of ways of creating housing 202 include, without limitation, injection molding, three-dimensional (3D) printing, stereolithography, CNC machining, plastic forming, plastic joining, binder joining, poly-jetting, fused deposition modeling, selective laser sintering, variations of one or more of the same, combinations of one or more of the same, or any other suitable housing creation techniques.

Housing 202 may be made of and/or include a variety of materials. Examples of such materials include, without limitation, plastics, rubbers, papers, woods, metals, glasses, bagasse, variations of one or more of the same, combinations of one or more of the same, or any other suitable materials.

As a specific example, a small robot may include a 34 millimeter (mm) ×48 mm PCB. The small robot may have 2 small vibration motors mounted to the bottom side of the PCB. These vibration motors may exclude the shaft weight that typically causes vibration in such vibration motors. The robot may also have a small 3.7 volt lithium-ion battery mounted to the top side of the PCB. This battery may be used to power the small robot, including the PCB and/or the vibration motors.

In this specific example, the robot may also include a plastic housing that at least partially houses the PCB. This plastic housing may include a mount or a cavity that holds and/or secures a neodymium magnet. This magnet may be placed and/or positioned between two steel $\frac{3}{32}$inch ×$\frac{1}{2}$steel rivets that serve as independently rotatable axles. Each of these rivets may include a small O-ring that sits and/or abuts the corresponding rivet head and serves as a wheel.

Continuing with this example, the magnetic force of the magnet may pull the steel rivets toward an inward point of the robot. By pulling the steel rivets toward the inward point in this way, the magnetic force of the magnet may cause the O-rings attached to the rivets to press against the shafts of the motors. As a result, the O-rings may rotate as the shafts of the motors rotate (e.g., when the motors are powered by electric current), thereby causing the robot to move on or across a surface. In other words, the rotation of the O-rings in this way may enable the robot to achieve magnetically harnessed locomotion.

As described above, FIGS. 1-5 are illustrations of exemplary apparatuses and/or systems for achieving magnetically harnessed locomotion of wheeled machines. However, the dimensions of the various components included in those exemplary apparatuses and/or systems are not necessarily illustrated or drawn to scale in FIGS. 1-5. For example, the size and/or length of the magnet and/or axles may vary from those shown in FIGS. 1-4 depending on certain characteristics (such as the magnetic characteristics and/or weight density) of the magnet and/or axles.

On the one hand, in the event that the axles are too long, the axles may stick to the magnet, thereby potentially causing too much friction to achieve magnetically harnessed locomotion. Additionally or alternatively, the wheels may be unable to even touch the motor shafts, much less abut and/or press against the motor shafts with sufficient force to achieve magnetically harnessed locomotion. On the other hand, in the event that the axles are too short, the magnetic force may be unable to pull the axles inward toward the magnet with sufficient force to facilitate magnetically harnessed locomotion, thereby potentially leaving the axles in an unstable condition or even liable to fall out of the wheeled machine.

In addition, although FIGS. 1-5 illustrate exemplary apparatuses and/or systems that include one magnet, two axles, two wheels, two motors, one circuit board, and two detachable housing pieces, other exemplary apparatuses and/or systems may include any number of magnets, axles, wheels, motors, circuit boards, and/or housing pieces. For example, a wheeled machine may include two magnets, four axles, four wheels, four motors, one circuit board, and/or three detachable housing pieces. In another example, a wheeled machine may include three magnets connected to one another, two axles, two wheels, two motors, two circuit boards, and/or one total housing piece.

Figure 6:
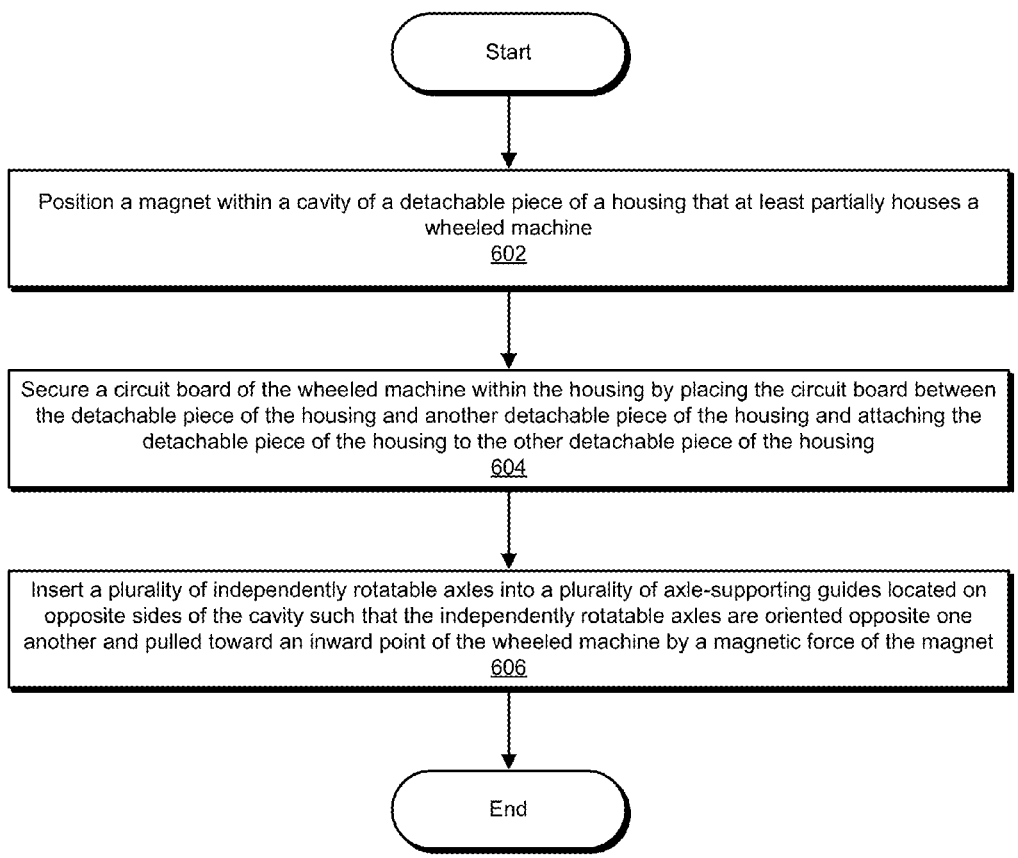
FIG. 6 is an illustration of an exemplary method for achieving magnetically harnessed locomotion of wheeled machines.

FIG. 6 is a flow diagram of an exemplary method 600 for achieving magnetically harnessed locomotion of wheeled machines. Method 600 may include the step of positioning a magnet within a cavity of a detachable piece of a housing that at least partially houses a wheeled machine that at least partially houses a wheeled machine (602). This positioning step may be performed in a variety of ways. For example, a user of a wheeled machine may insert and/or place a magnet within a cavity (e.g., a mount) of a detachable piece of a housing that at least partially houses the wheeled machine. Additionally or alternatively, a manufacturer of a wheeled machine may (whether by automated assembly machine or manual human assembly) insert and/or place a magnet within a cavity (e.g., a mount) of a detachable piece of a housing that at least partially houses the wheeled machine.

Returning to FIG. 6, method 600 may also include the step of securing a circuit board of the wheeled machine within the housing by (1) placing the circuit board between the detachable piece of the housing and another detachable piece of the housing and (2) attaching the detachable piece of the housing to the other detachable piece of the housing (604). This securing step may be performed in a variety of ways. For example, a user or manufacturer of a wheeled machine may place a circuit board between two detachable pieces of a housing. In this example, the user or manufacturer of the wheeled machine may attach and/or connect the detachable pieces of the housing together, thereby securing the circuit board of the wheeled machine within the housing.

Returning to FIG. 6, method 600 may also include the step of inserting a plurality of independently rotatable axles into a plurality of axle-supporting guides located on substantially opposite sides of the cavity such that the independently rotatable axles are oriented substantially opposite one another and pulled toward an inward point of the wheeled machine by a magnetic force of the magnet (606). This inserting step may be performed in a variety of ways. For example, a user or manufacturer of a wheeled machine may insert a plurality of independently rotatable axles into a plurality of axle-supporting guides located on substantially opposite sides of the cavity. In this example, each of the independently rotatable axles may include a wheel.

By being inserted into the plurality of axle-supporting guides in this way, the independently rotatable axles may be oriented substantially opposite one another and pulled toward an inward point of the wheeled machine by a magnetic force of the magnet. As a result of this magnetic force, the wheels included on the independently rotatable axles may each press against the shaft of a motor attached to the circuit board. These motor shafts may be oriented substantially perpendicular to the independently rotatable axles.

While the foregoing disclosure sets forth various embodiments using specific illustrations, flowcharts, and examples, each illustration component, flowchart step, operation, and/or component described and/or exemplified herein may be implemented, individually and/or collectively, using a wide range of mechanical, hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of."

Finally, for ease of use, the terms "including" and "having" (and their derivatives), as used in the specification and claims, are interchangeable with and have the same meaning as the word "comprising."

What is claimed is:

1. An apparatus comprising:
   a housing that at least partially houses a wheeled machine;
   a plurality of wheels attached to a plurality of independently rotatable axles that are oriented substantially opposite one another along a plane of the wheeled machine;
   a plurality of motors having shafts oriented substantially perpendicular to the independently rotatable axles;
   at least one magnet positioned between the independently rotatable axles within the housing such that a magnetic force of the magnet:
      pulls the independently rotatable axles toward an inward point of the wheeled machine;
      causes the wheels attached to the independently rotatable axles to press against the shafts of the motors.

2. The apparatus of claim 1, further comprising a circuit board of the wheeled machine;
   wherein the housing comprises a plurality of detachable pieces that, when connected to one another, substantially envelop the circuit board.

3. The apparatus of claim 2, wherein the motors are mounted on the circuit board of the wheeled machine.

4. The apparatus of claim 1, wherein the housing includes a cavity that holds the magnet between the independently rotatable axles.

5. The apparatus of claim 4, wherein the cavity that holds the magnet is located on a detachable piece of the housing and is accessible only when the detachable piece of the housing is detached from another detachable piece of the housing.

6. The apparatus of claim 1, wherein the housing includes a mount that holds the magnet between the independently rotatable axles.

7. The apparatus of claim 1, wherein the housing includes an exterior design that resembles an automobile.

8. The apparatus of claim 1, wherein the housing includes an exterior design that resembles an animal.

9. The apparatus of claim 1, wherein the housing includes a plurality of axle-supporting guides that support the independently rotatable axles being pulled toward the inward point of the wheeled machine.

10. The apparatus of claim 1, wherein the magnetic force of the magnet causes the wheels attached to the independently rotatable axles to rotate as the shafts of the motors rotate.

11. The apparatus of claim 1, wherein the housing is injection molded.

12. The apparatus of claim 1, wherein the wheeled machine comprises at least one of:
   a wheeled robot;
   a wheeled toy.

13. A housing for a wheeled machine, the housing comprising:
   a plurality of axle-supporting guides that support a plurality of independently rotatable axles that:
   are oriented substantially opposite one another along a plane of the wheeled machine;
   each include a wheel;
   a cavity that holds a magnet between the independently rotatable axles such that a magnetic force of the magnet:
      pulls the independently rotatable axles toward an inward point of the wheeled machine;
      causes each wheel included on the independently rotatable axles to press against a shaft of a motor oriented substantially perpendicular to the independently rotatable axles on the wheeled machine.

14. The housing of claim 13, further comprising:
   a space for setting a circuit board of the wheeled machine;
   a plurality of detachable pieces that, when connected to one another, substantially envelop the circuit board.

15. The housing of claim 14, wherein each motor is mounted on the circuit board of the wheeled machine.

16. The housing of claim 13, wherein the cavity that holds the magnet is located on a detachable piece of the housing and is accessible only when the detachable piece of the housing is detached from another detachable piece of the housing.

17. The housing of claim 13, wherein the cavity is formed by a mount that holds the magnet between the independently rotatable axles.

18. The housing of claim 13, further comprising an exterior surface designed to resemble an automobile.

19. The housing of claim 13, further comprising an exterior surface designed to resemble an animal.

20. A method comprising:
   positioning a magnet within a cavity of a detachable piece of a housing that at least partially houses a wheeled machine;
   securing a circuit board of the wheeled machine within the housing by:
      placing the circuit board of the wheeled machine between the detachable piece of the housing and another detachable piece of the housing;
      attaching the detachable piece of the housing to the other detachable piece of the housing;
   inserting a plurality of independently rotatable axles that each include a wheel into a plurality of axle-supporting guides located on substantially opposite sides of the cavity such that:
      the independently rotatable axles are oriented substantially opposite one another along a plane of the wheeled machine;
      the independently rotatable axles are pulled toward an inward point of the wheeled machine by a magnetic force of the magnet;
      each wheel included on the independently rotatable axles presses against a shaft of a motor that is attached to the circuit board and oriented substantially perpendicular to the independently rotatable axles.

* * * * *